United States Patent
Cooper

(10) Patent No.: US 10,538,342 B2
(45) Date of Patent: Jan. 21, 2020

(54) ECLIPTIC SUN ACQUISITION CONTROL MODE FOR SATELLITES

(71) Applicant: Space Systems/Loral, LLC, Palo Alto, CA (US)

(72) Inventor: John Hutton Cooper, Sunnyvale, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 205 days.

(21) Appl. No.: 15/603,288

(22) Filed: May 23, 2017

(65) Prior Publication Data

US 2018/0339792 A1    Nov. 29, 2018

(51) Int. Cl.
*B64G 1/36* (2006.01)
*B64G 1/24* (2006.01)
*G06F 19/00* (2018.01)

(52) U.S. Cl.
CPC ............ *B64G 1/363* (2013.01); *B64G 1/242* (2013.01)

(58) Field of Classification Search
CPC . B64G 1/288; B64G 1/36; B64G 1/44; B64G 1/109
USPC ...................................................... 701/13, 3
See application file for complete search history.

(56) References Cited

U.S. PATENT DOCUMENTS

| | | | |
|---|---|---|---|
| 5,107,434 A | 4/1992 | Paluszek | |
| 5,826,828 A * | 10/1998 | Fowell | B64G 1/24 244/164 |
| 6,266,616 B1 * | 7/2001 | Needelman | B64G 1/285 701/513 |
| 6,289,268 B1 | 9/2001 | Didinsky et al. | |
| 6,695,263 B1 | 2/2004 | Goodzeit | |
| 7,874,519 B2 | 1/2011 | Brumfield | |
| 9,921,099 B1 * | 3/2018 | Davila | G02B 5/003 |
| 2003/0023355 A1 | 1/2003 | Johnson et al. | |
| 2003/0029970 A1 | 2/2003 | Wang et al. | |
| 2005/0133671 A1 | 6/2005 | Wang et al. | |
| 2006/0186274 A1 * | 8/2006 | Wang | B64G 1/244 244/158.4 |
| 2009/0222153 A1 | 9/2009 | Johnson | |
| 2009/0224105 A1 * | 9/2009 | Caplin | B64G 1/1085 244/158.4 |
| 2011/0297794 A1 | 12/2011 | Johnson | |
| 2014/0032022 A1 | 1/2014 | Caullier et al. | |
| 2017/0144781 A1 * | 5/2017 | Shoer | B64G 1/363 |

OTHER PUBLICATIONS

European Extended Search Report dated Sep. 12, 2018 in EP Application No. 18170229.1.

* cited by examiner

*Primary Examiner* — Tan Q Nguyen
(74) *Attorney, Agent, or Firm* — Weaver Austin Villeneuve & Sampson LLP

(57) ABSTRACT

Techniques for orienting an earth-orbiting spacecraft include determining, using a star tracker on board the spacecraft, a first vector aligned between an ecliptic pole of the earth and the spacecraft, adjusting attitude of the spacecraft so as to align a first axis of the spacecraft with the first vector, and rotating the spacecraft about the first axis until presence of the sun is registered. Rotation rates may be subsequently reduced, such that the sun remains within a field of view of the sun sensor or of a solar array of the spacecraft.

17 Claims, 5 Drawing Sheets

ECLIPTIC SUN ACQUISITION CONTROL MODE FOR SATELLITES

TECHNICAL FIELD

The present disclosure relates generally to spacecraft attitude control, and more particularly to improved techniques for sun acquisition.

BACKGROUND

The assignee of the present invention manufactures and deploys spacecraft for observation of the earth and other celestial bodies, and to provide broadcast and communications services, for example. To perform their mission, the payloads and solar panels of such spacecraft must be oriented and maintained in a particular orientation with respect to the earth (or other celestial body) or with respect to the earth and sun. For example, the general requirement for three-axis, body-stabilized spacecraft operating in geostationary orbit is to orient the spacecraft such that the payload is directed toward the earth and the axis of rotation of the solar array is orthogonal to the earth's equatorial plane. In such orientation, the solar arrays are enabled to rotate in such a manner to compensate for the spacecraft's motion with respect to the sun. Maintenance of this desired three-axis attitude is provided by way of attitude and rate sensors coupled to torque generators through an attitude determination and control subsystem, which includes an onboard computer referred to as the spacecraft controller. Attitude sensors may comprise celestial body observers, such as earth sensors, sun sensors and star trackers. Rate sensors may comprise such devices as digital integrating rate assemblies or gyros. Torque generators may comprise such devices as thrusters, magnetic torquers or momentum or reaction wheels.

U.S. Pat. No. 7,874,519, assigned to the assignee of the present invention and U.S. Pat. No. 6,695,263 disclose techniques for achieving or reacquiring three-axis attitude control. To achieve or reacquire three-axis attitude control, generally requires determining a direction of the sun with respect to a spacecraft coordinate frame. Satellites are configured with digital or analog sun sensors for that purpose, and six to eight such sensors may typically be required for a geosynchronous satellite. Alternatively or in addition, when orbital parameters and time are known, the sun's vector with respect to the spacecraft orbital position can be calculated, and so a spacecraft with a star tracker can be re-oriented to be sun-pointing.

The presently disclosed techniques enable reducing the number of required sun sensors and also enhance satellite autonomy.

SUMMARY

According to some implementations, a method for orienting an earth-orbiting spacecraft includes determining, using a star tracker on board the spacecraft, a first vector aligned between an ecliptic pole of the earth and the spacecraft adjusting attitude of the spacecraft so as to align a first axis of the spacecraft with the first vector, and rotating the spacecraft about the first axis until presence of the sun is registered.

In some examples, the presence of the sun may be registered by a sun sensor of the spacecraft. In some examples, the method may further include reducing rotation rates of the spacecraft such that the sun remains within a field of view of the sun sensor or of a solar array of the spacecraft. In some examples, the method may further include controlling the spacecraft using sun sensor data for angle determination in one or more axes.

In some examples, the determining step may be executed in the absence of knowledge of at least one of spacecraft orbital position, orbit epoch and angular rates.

In some examples, the determining step may be executed in the absence of knowledge of each of spacecraft orbital position, orbit epoch and angular rates.

In some examples, the presence of the sun is registered by a solar array of the spacecraft. In some examples, use of a sun sensor may be avoided.

In some examples, the first axis may be parallel or substantially co-aligned with an axis of rotation of a solar array of the spacecraft.

According to some implementations, a spacecraft includes a spacecraft controller and a star tracker, the spacecraft controller configured to: (i) determine, using the star tracker, a first vector aligned between an ecliptic pole of the earth and the spacecraft; (ii) adjust attitude of the spacecraft so as to align a first axis of the spacecraft with the first vector; and (iii) rotate the spacecraft about the first axis until presence of the sun is registered.

In some examples, the spacecraft may further include a sun sensor, wherein the presence of the sun is registered by the sun sensor. In some examples, the spacecraft controller may be configured to reduce rotation rates of the spacecraft such that the sun remains within a field of view of the sun sensor or of a solar array of the spacecraft.

In some examples, the spacecraft controller may be configured to determine the first vector in the absence of knowledge of at least one of spacecraft orbital position, orbit epoch and angular rates.

In some examples, the spacecraft controller may be configured to determine the first vector in the absence of knowledge of each of spacecraft orbital position, orbit epoch and angular rates.

In some examples, the presence of the sun may be registered by a solar array of the spacecraft. In some examples, use of a sun sensor may be avoided.

In some examples, the first axis may be parallel or substantially co-aligned with an axis of rotation of a solar array of the spacecraft.

According to some implementations, on a non-transitory computer readable medium having software stored thereon, the software includes instructions for causing a spacecraft controller to: (i) determine, using a star tracker, a first vector aligned between an ecliptic pole of the earth and a spacecraft including the spacecraft controller and the star tracker; (ii) adjust attitude of the spacecraft so as to align a first axis of the spacecraft with the first vector; and (iii) rotate the spacecraft about the first axis until presence of the sun is registered.

In some examples, the software may further include instructions for causing the controller to reduce rotation rates of the spacecraft such that the sun remains within a field of view of a sun sensor or of a solar array of the spacecraft.

In some examples, the software may further include instructions for causing the controller to determine the first vector in the absence of knowledge of one or all of spacecraft orbital position, orbit epoch and angular rates.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
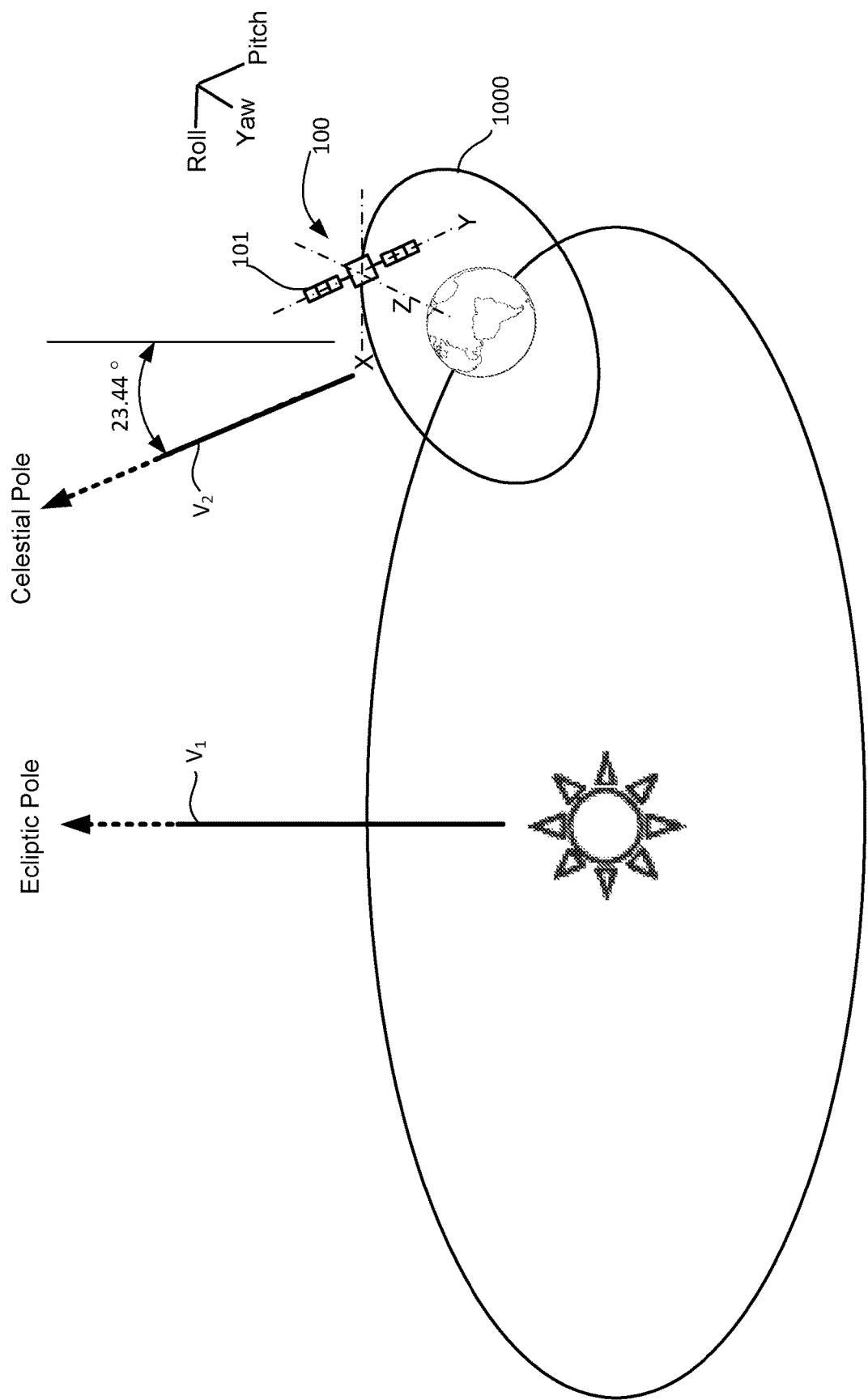
FIG. 1 provides a conceptual diagram of a spacecraft in earth orbit.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The present disclosure relates to an "ecliptic sun acquisition control mode" that enables prompt and reliable reacquisition of a sun pointing orientation using inertial attitude data provided by a star tracker. The disclosed techniques may be effective even in the absence of knowledge of initial spacecraft attitude, angular rates and/or orbital position. As described in more detail hereinbelow, the techniques first orients an arbitrary spacecraft axis, referred to as the −Y axis, so as to be directed toward one of the earth's ecliptic poles. The −Y axis, when so directed will, by definition be located 90° ecliptic plane at all times of the year. The North ecliptic pole, for example, is located in the constellation Draco.

In an implementation, a star tracker may be used to obtain knowledge of the spacecraft's inertial attitude and/or angular rates of motion with respect to inertial space. The star tracker may be configured to compare actually observed stars with a database, such as a star catalogue associated with the star tracker, and to make an identification of the observed stars based on the comparison. Once identified, the star tracker and/or spacecraft controller may use known location data for the identified stars to make a determination of the spacecraft's attitude and angular rates of motion with respect to inertial space. Given a determination of the spacecraft's inertial attitude and angular rates, the spacecraft controller may be configured to reorient the −Y axis toward the North or South ecliptic pole. The −Y axis may be reoriented autonomously by the spacecraft controller irrespective of whether information regarding date, time and orbit parameters is available to the spacecraft controller.°

With the −Y axis aligned toward the ecliptic pole, a vector toward the sun in the body frame is still not determined, but the sun is known to be in the X-Z spacecraft body plane. A slew about the Y axis may then be performed to search for the sun until presence of the sun is registered on a sun sensor, for example, or a solar array.

FIG. 1 provides a conceptual diagram of a spacecraft in earth orbit. The spacecraft 100 is shown disposed in an orbit 1000. The orbit 1000 may be an equatorial or near equatorial orbit. In some implementations, the orbit 1000 may be a geosynchronous or geostationary orbit. It will be appreciated that the earth's equatorial plane is at an approximately 23.44° angle with respect to the ecliptic plane of the earth's orbit around the sun. Accordingly, a first vector, $V_1$ that is normal to the ecliptic plane is oriented toward the ecliptic pole and is at an approximately 23.44° angle with respect to a second vector $V_2$ that is normal to the earth's equatorial axis (and the plane of orbit 1000, in the illustrated example).

In some implementations, the spacecraft 100 may be configured to operate with respect to an orbital plane of orbit 1000, such that the spacecraft has a yaw axis within the orbital plane directed from a spacecraft coordinate system origin toward nadir, a pitch axis orthogonal to the orbital plane and passing through the spacecraft coordinate system origin, and a roll axis orthogonal to the pitch axis and the yaw axis passing through the spacecraft coordinate system origin.

In a normal (non-anomalous) operational configuration, a spacecraft Y axis, that is parallel or substantially co-aligned with a rotational axis of a solar array 101, may be approximately aligned with the pitch axis. It will be appreciated that, where the orbit 1000 is in an equatorial or near equatorial orbit, the spacecraft pitch axis will ordinarily be directed toward the earth's south celestial pole. A spacecraft X axis and Z axis, mutually orthogonal and each orthogonal to the Y axis may also be defined to complete a body frame coordinate system. In the normal operational configuration, the X axis may be aligned with the roll axis, whereas the Z axis may be aligned with the yaw axis.

Figure 2:
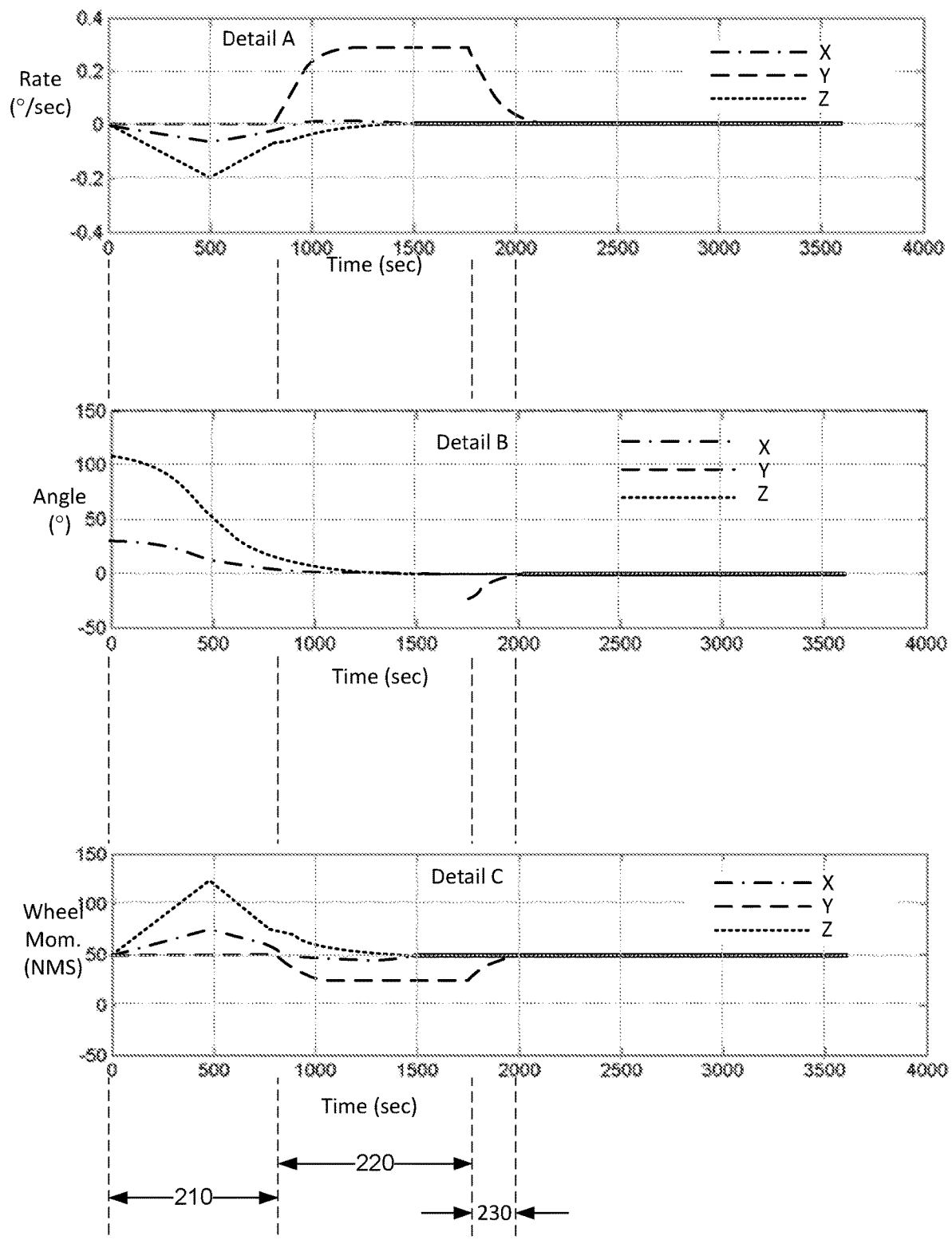
FIG. 2 illustrates results of a simulation of the presently disclosed techniques.

FIG. 2 illustrates results of a simulation of the presently disclosed techniques. During a first phase 210, a first vector toward the ecliptic pole is found, using the star tracker, and the Y axis is aligned with the first vector. As shown in Detail A, spacecraft angular rates, assumed for simplicity of illustration to be initially zero, increase to a maximum at about 500 second, then are reduced to near zero by about 800 seconds. At the completion of the first phase 210, the Y axis of the spacecraft is approximately oriented toward the ecliptic pole. In the absence of information regarding date, time and orbit parameters, a vector to the sun at the end first phase 210 remains unknown at the end of first phase 210.

Angular rates about the Y axis are then increased at the start of a second phase 220. Because the Y axis is orthogonal to the ecliptic plane, rotation about the Y axis is certain to result, within less than 360° of rotation, in acquiring the sun. Sun acquisition may be registered by a dedicated sun sensor. Alternatively, or in addition, sun acquisition may be registered by measuring solar power received by the spacecraft solar arrays. In the illustrated simulation, it may be observed (Detail B) that the sun is first acquired the end of the second phase 220, at about 1800 seconds after start of the ecliptic sun acquisition control mode.

The spacecraft may then be stabilized in a sun-oriented attitude. In the illustrated simulation, this requires about 200 additional seconds. More particularly, approximately 1800 seconds after start, the sun has been found. A sun sensor may be aligned therewith, and the angular rates returned to near zero, a process that is shown to take place over a third phase 230 that requires, in the illustrated simulation, about 200 seconds. Thus, sun reacquisition is shown to be accomplished in a total time of less than 40 minutes, even in the absence of information regarding date, time and orbit parameters.

In the example simulation illustrated in FIG. 2, it is assumed that reaction wheels provide the control authority for adjusting spacecraft rates by momentum exchange between the spacecraft body and the reaction wheels. Detail C shows the wheel momentum storage, in newton-meter-seconds (NMS) as a function of time for the illustrated simulation.

An advantage of the presently disclosed techniques is that, even in implementations relying on a sun sensor for sun acquisition, only a single sun sensor may be required (although reliability considerations may dictate a second redundant sun sensor). A further advantage is that the techniques are operable whether or not spacecraft orbital position, orbit epoch and angular rates are known.

The techniques may be used as a nominal transfer orbit procedure or in a recovery mode in case of an anomaly (e.g. a "loss of lock" anomaly).

Figure 3:
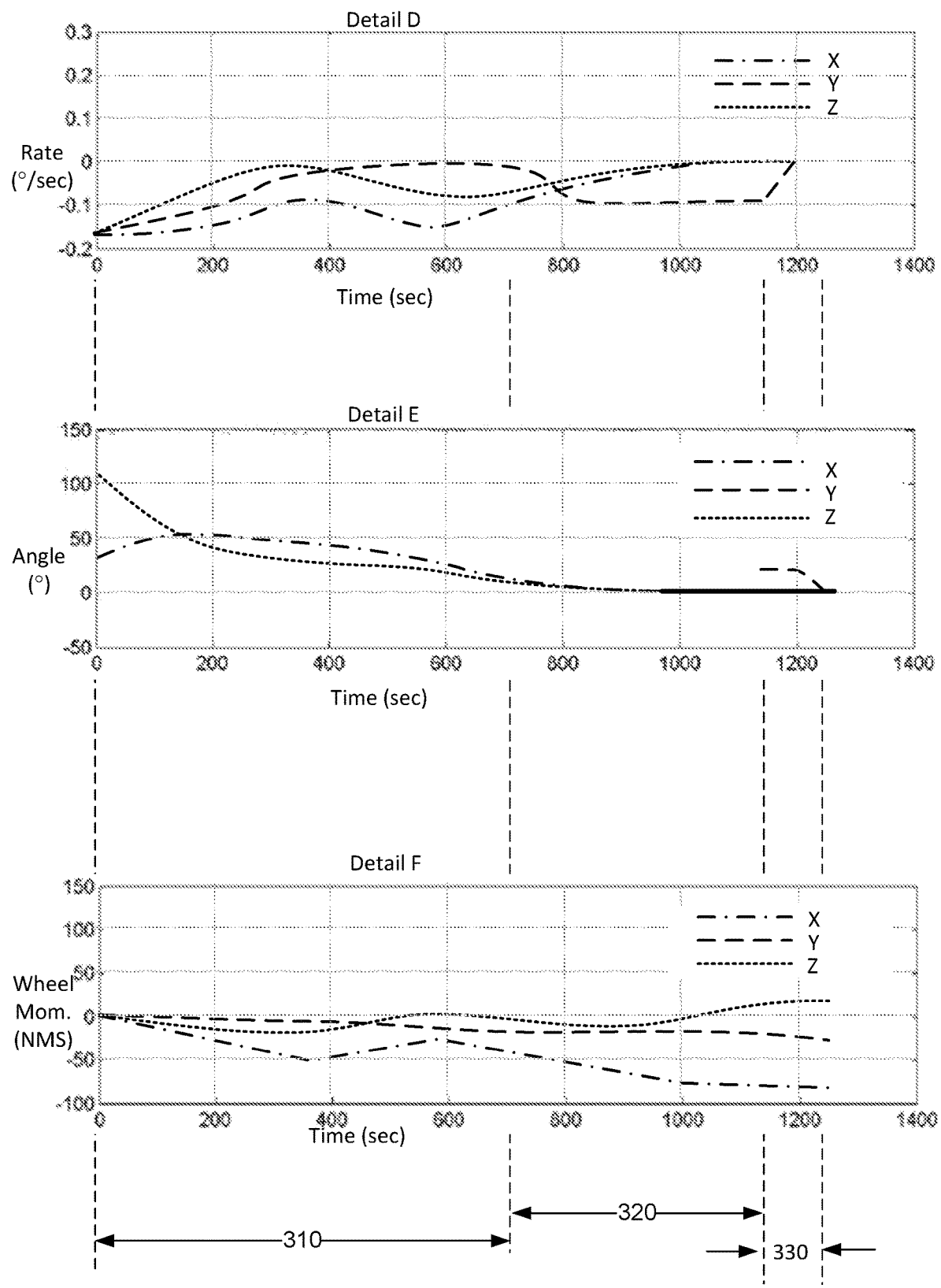
FIG. 3 illustrates results of another simulation of the presently disclosed techniques.

FIG. 3 illustrates results of another simulation of the presently disclosed techniques. During a first phase 310, a first vector toward the ecliptic pole is found, using the star tracker, and the Y axis is aligned with the first vector. As shown in Detail D, spacecraft angular rates, assumed to be initially about −0.18° about each axis, are reduced to near zero by about 700 seconds. At the completion of the first phase 310, the Y axis of the spacecraft is approximately oriented toward the ecliptic pole. In the absence of information regarding date, time and orbit parameters, a vector to the sun at the end first phase 310 remains unknown at the end of first phase 210.

Angular rates about the Y axis are then increased at the start of a second phase 320. Because the Y axis is orthogonal to the ecliptic plane, rotation about the Y axis is certain to result, within less than 360° of rotation, in acquiring the sun. Sun acquisition may be registered by a dedicated sun sensor. Alternatively, or in addition, sun acquisition may be registered by measuring solar power received by the spacecraft solar arrays. In the illustrated simulation, it may be observed (Detail E) that the sun is first acquired the end of the second phase 320, at about 1150 seconds after start of the ecliptic sun acquisition control mode.

The spacecraft may then be stabilized in a sun-oriented attitude. In the illustrated simulation, this requires about 200 additional seconds. More particularly, approximately 1800 seconds after start, the sun has been found. A sun sensor may be aligned therewith, and the angular rates returned to near zero, a process that is shown to take place over a third phase 230 that requires, in the illustrated simulation, about 100 seconds. Thus, in the simulation illustrated in FIG. 3, sun reacquisition is accomplished in a total time of less than about 25 minutes, even in the absence of information regarding date, time and orbit parameters.

In the example simulation illustrated in FIG. 3, it is assumed that reaction wheels provide the control authority for adjusting spacecraft rates by momentum exchange between the spacecraft body and the reaction wheels. Detail F shows the wheel momentum storage NMS as a function of time for illustrated simulation.

Figure 4:
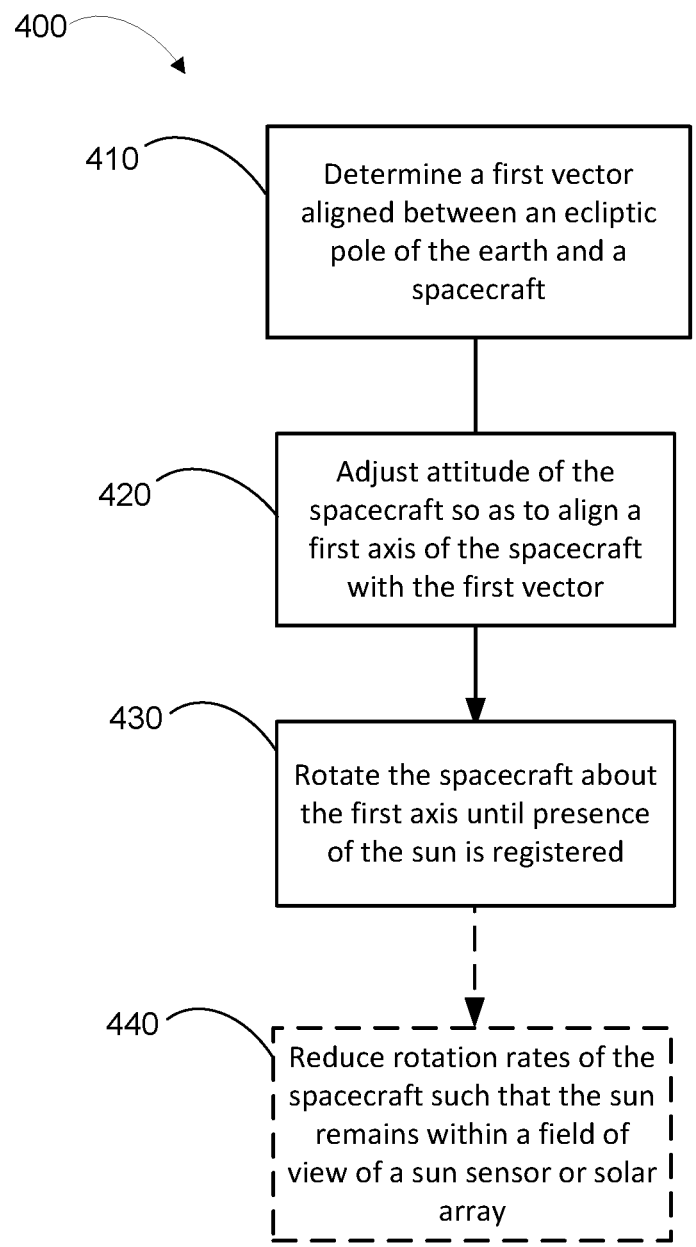
FIG. 4 illustrates a method for orienting an earth-orbiting spacecraft, according to an implementation.

Referring now to FIG. 4, a method 400 for orienting an earth-orbiting spacecraft will be described. At block 410, a first vector aligned between an ecliptic pole of the earth and the spacecraft may be determined, using a star tracker.

At block 420, an attitude of the spacecraft may be adjusted so as to align a first axis of the spacecraft with the first vector. As described hereinabove, the first axis may parallel or substantially co-aligned with an axis of rotation of a solar array of the spacecraft.

At block 430, the spacecraft may be rotated about the first until presence of the sun is registered. Sun presence may be registered by a sun sensor, for example or by a solar array of the spacecraft.

Optionally, at block 440, rotation rate so the spacecraft may be reduced such that the sun remains within a field of view of the sun sensor or of a solar array of the spacecraft.

Figure 5:
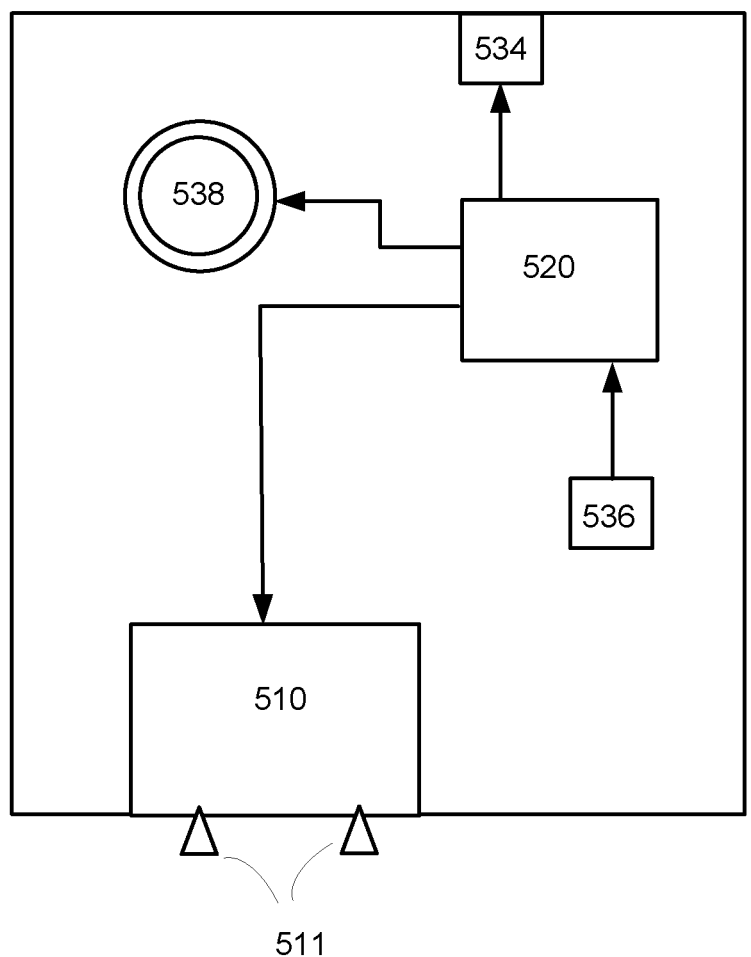
FIG. 5 illustrates a simplified block diagram of an example spacecraft, according to an implementation.

Referring now to FIG. 5, an example block diagram of a spacecraft 500 according to an embodiment is illustrated. Spacecraft 500 may include propulsion subsystem 510 and spacecraft controller 520. In an embodiment, for example, propulsion subsystem 510 may include propulsion equipment, such as tankage and control and service devices (not illustrated) and thrusters 511.

Referring still to FIG. 5, spacecraft controller 520 may include or be included in a spacecraft attitude and orbit control subsystem. In the illustrated example, spacecraft controller 520 is communicatively coupled with propulsion subsystem 510 and may be configured to control the operation of propulsion subsystem 510, including thrusters 511. Spacecraft controller 520 may be configured to execute, autonomously, or in response to ground command, the presently disclosed techniques of acquiring or reacquiring the sun.

Referring still to FIG. 5, in the illustrated implementation, the spacecraft 500 includes one or more star trackers 534 and/or inertial rate sensors 536. Inertial rate sensor 536 may include a digital integrating rate assembly (DIRA) or the like. In an embodiment, determination of spacecraft inertial attitude may be performed by spacecraft controller 520 using the output of star tracker 534 and/or inertial sensor 536. Determination of spacecraft inertial attitude may be performed using only the output of the star tracker 534 and/or the inertial rate sensor 536. In the illustrated implementation, the spacecraft 500 also includes one or more reaction wheels 538 which may be configured as torque actuators to control spacecraft rotation rates about one or more axes.

Implementations of the subject matter described in this specification may be implemented as one or more computer programs, i.e., one or more modules of computer program instructions, encoded on non-transitory computer readable medium for execution by, or to control the operation of, a data processing apparatus, such as, for example, spacecraft controller 520.

Thus, techniques for orienting an earth-orbiting spacecraft have been disclosed. The foregoing merely illustrates principles of the invention. It will be appreciated that those skilled in the art will be able to devise numerous systems and methods which, although not explicitly shown or described herein, embody said principles of the invention and are thus within the spirit and scope of the invention as defined by the following claims.

What is claimed is:

1. A method for orienting an earth-orbiting spacecraft, the method comprising:
   determining, using a star tracker on board the spacecraft, a first vector aligned between an ecliptic pole of the earth and the spacecraft;
   adjusting attitude of the spacecraft so as to align a first axis of the spacecraft with the first vector;

rotating the spacecraft about the first axis until presence of the sun is registered; and reducing rotation rates of the spacecraft such that the sun remains within a field of view of a sun sensor or of a solar array of the spacecraft.

2. The method of claim 1, wherein the presence of the sun is registered by the sun sensor of the spacecraft.

3. The method of claim 2, further comprising controlling the spacecraft using sun sensor data for angle determination in one or more axes.

4. The method of claim 1, wherein the determining step is executed in the absence of knowledge of at least one of spacecraft orbital position, orbit epoch and angular rates.

5. The method of claim 1, wherein the determining step is executed in the absence of knowledge of each of spacecraft orbital position, orbit epoch and angular rates.

6. The method of claim 1, wherein the presence of the sun is registered by a solar array of the spacecraft.

7. The method of claim 6, wherein use of a sun sensor is avoided.

8. The method of claim 1, wherein the first axis is parallel or substantially co-aligned with an axis of rotation of a solar array of the spacecraft.

9. A spacecraft comprising a spacecraft controller and a star tracker, the spacecraft controller configured to:
 determine, using the star tracker, a first vector aligned between an ecliptic pole of the earth and the spacecraft;
 adjust attitude of the spacecraft so as to align a first axis of the spacecraft with the first vector;
 rotate the spacecraft about the first axis until presence of the sun is registered; and
 reduce rotation rates of the spacecraft such that the sun remains within a field of view of a sun sensor or of a solar array of the spacecraft.

10. The spacecraft of claim 9, wherein the presence of the sun is registered by the sun sensor.

11. The spacecraft of claim 9, wherein the spacecraft controller is configured to determine the first vector in the absence of knowledge of at least one of spacecraft orbital position, orbit epoch and angular rates.

12. The spacecraft of claim 9, wherein the spacecraft controller is configured to determine the first vector in the absence of knowledge of each of spacecraft orbital position, orbit epoch and angular rates.

13. The spacecraft of claim 9, wherein the presence of the sun is registered by a solar array of the spacecraft.

14. The spacecraft of claim 13, wherein use of a sun sensor is avoided.

15. The spacecraft of claim 9, wherein the first axis is parallel or substantially co-aligned with an axis of rotation of a solar array of the spacecraft.

16. A non-transitory computer readable medium having software stored thereon, the software including instructions for causing a spacecraft controller to:
 determine, using a star tracker, a first vector aligned between an ecliptic pole of the earth and a spacecraft including the spacecraft controller and the star tracker;
 adjust attitude of the spacecraft so as to align a first axis of the spacecraft with the first vector;
 rotate the spacecraft about the first axis until presence of the sun is registered; and
 reduce rotation rates of the spacecraft such that the sun remains within a field of view of a sun sensor or of a solar array of the spacecraft.

17. The computer readable medium of claim 16, the software further including instructions for causing the controller to determine the first vector in the absence of knowledge of one or all of spacecraft orbital position, orbit epoch and angular rates.

* * * * *